April 17, 1956

E. W. CARROLL 2,742,137

FRUIT SORTING DEVICE

Filed May 11, 1951

INVENTOR.
ELLSWORTH W. CARROLL

His Patent Attorney

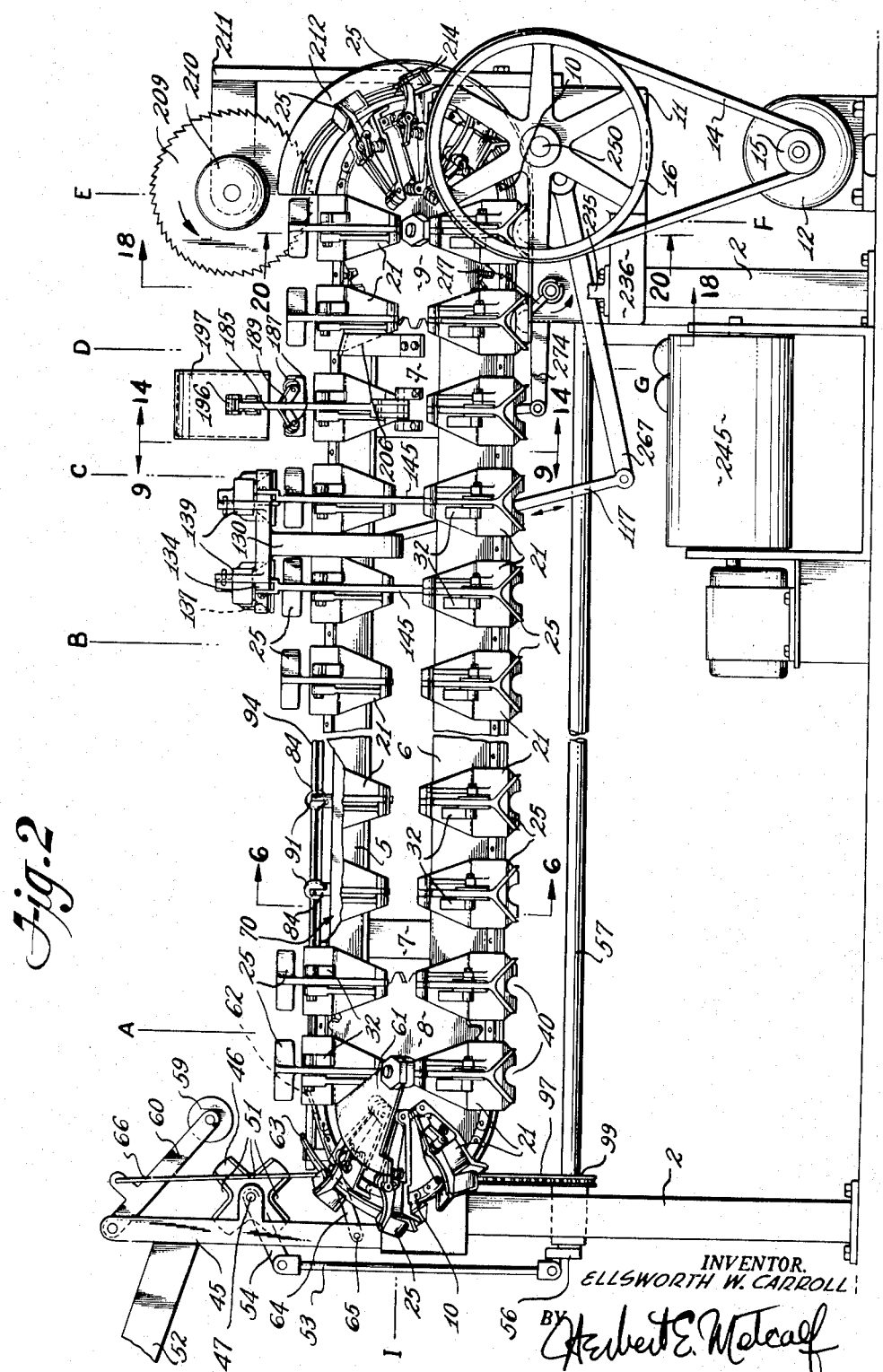

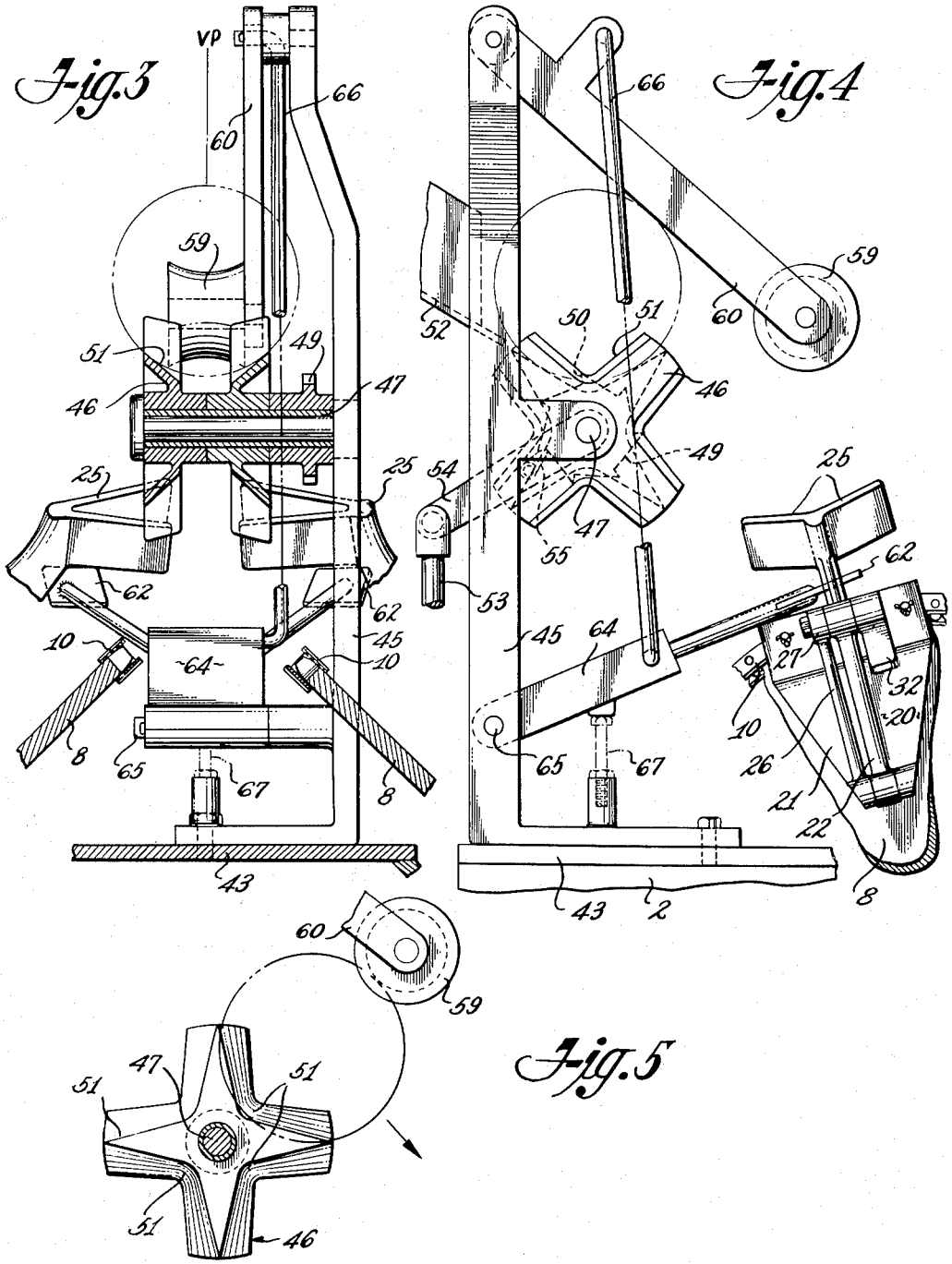

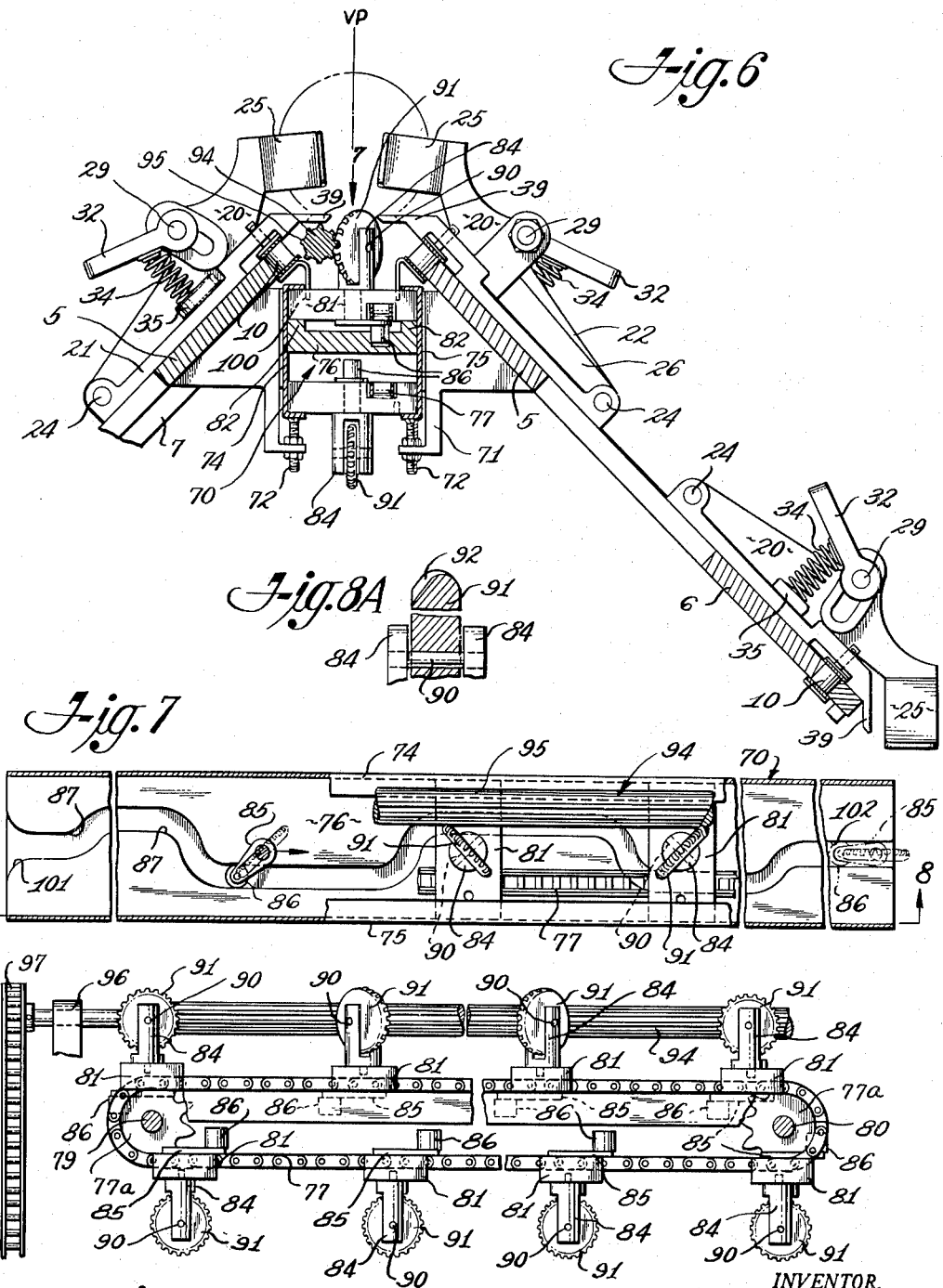

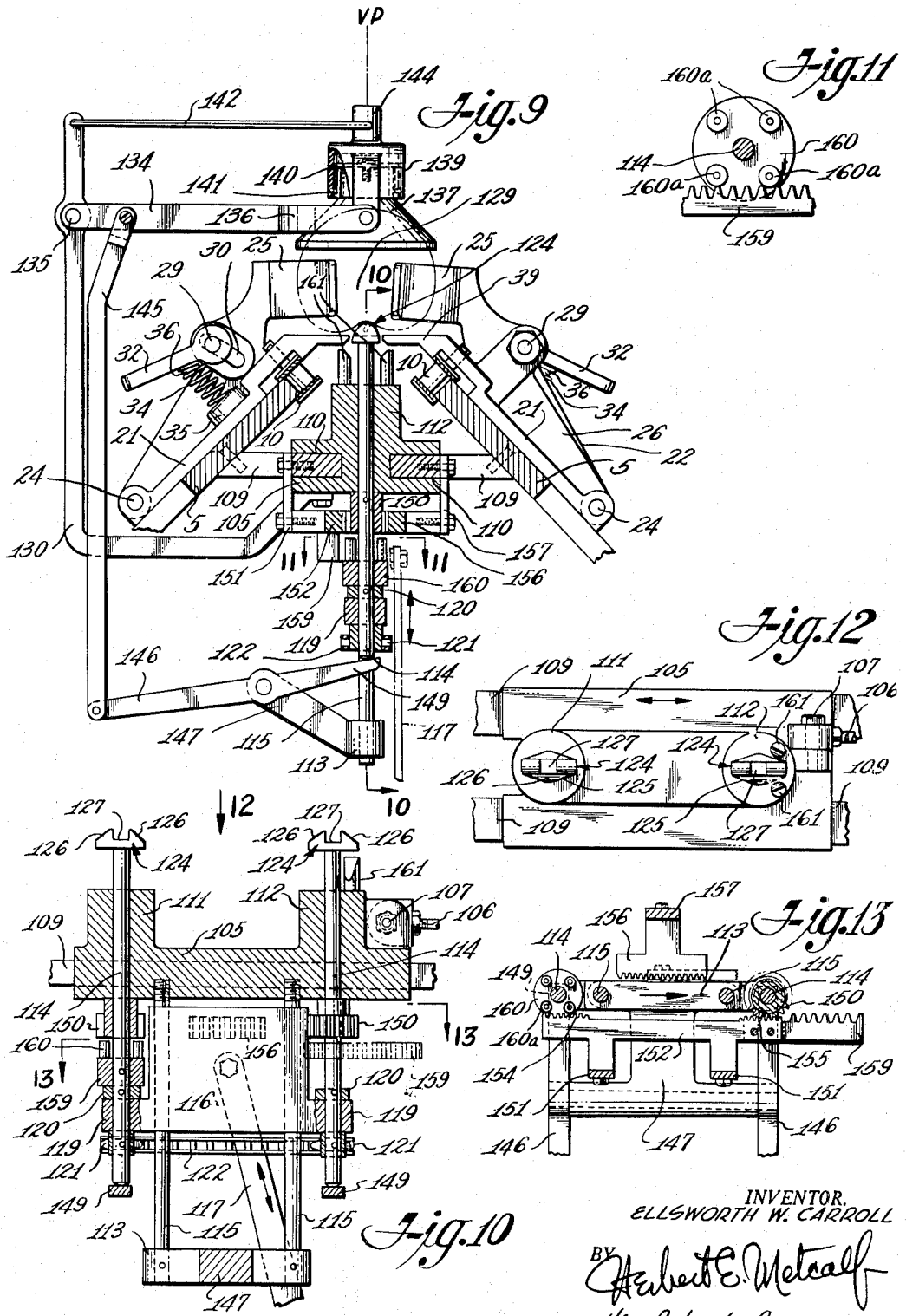

April 17, 1956 E. W. CARROLL 2,742,137
FRUIT SORTING DEVICE
Filed May 11, 1951 10 Sheets-Sheet 6

INVENTOR.
ELLSWORTH W. CARROLL
BY Herbert E. Metcalf
His Patent Attorney

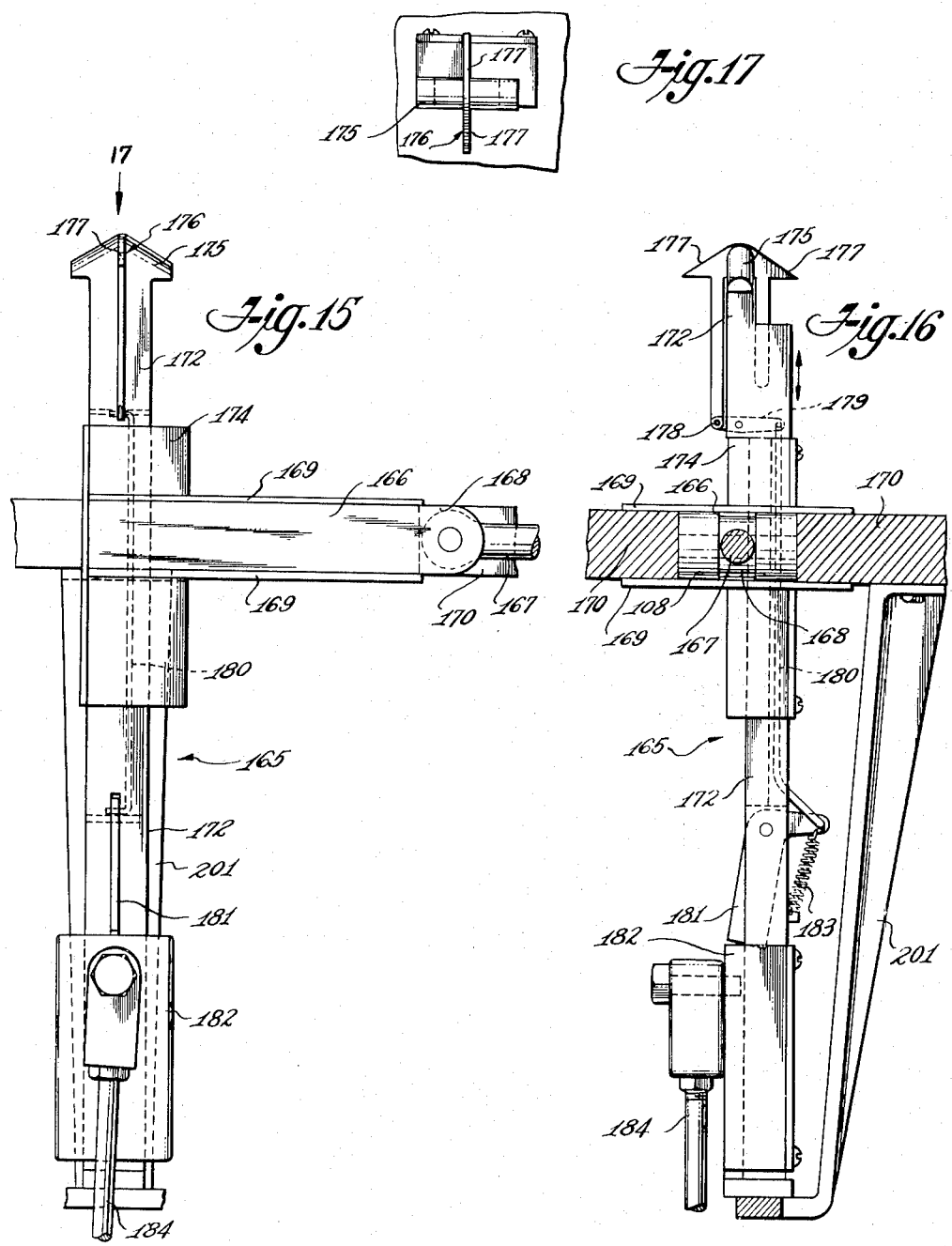

April 17, 1956   E. W. CARROLL   2,742,137
FRUIT SORTING DEVICE
Filed May 11, 1951   10 Sheets-Sheet 8
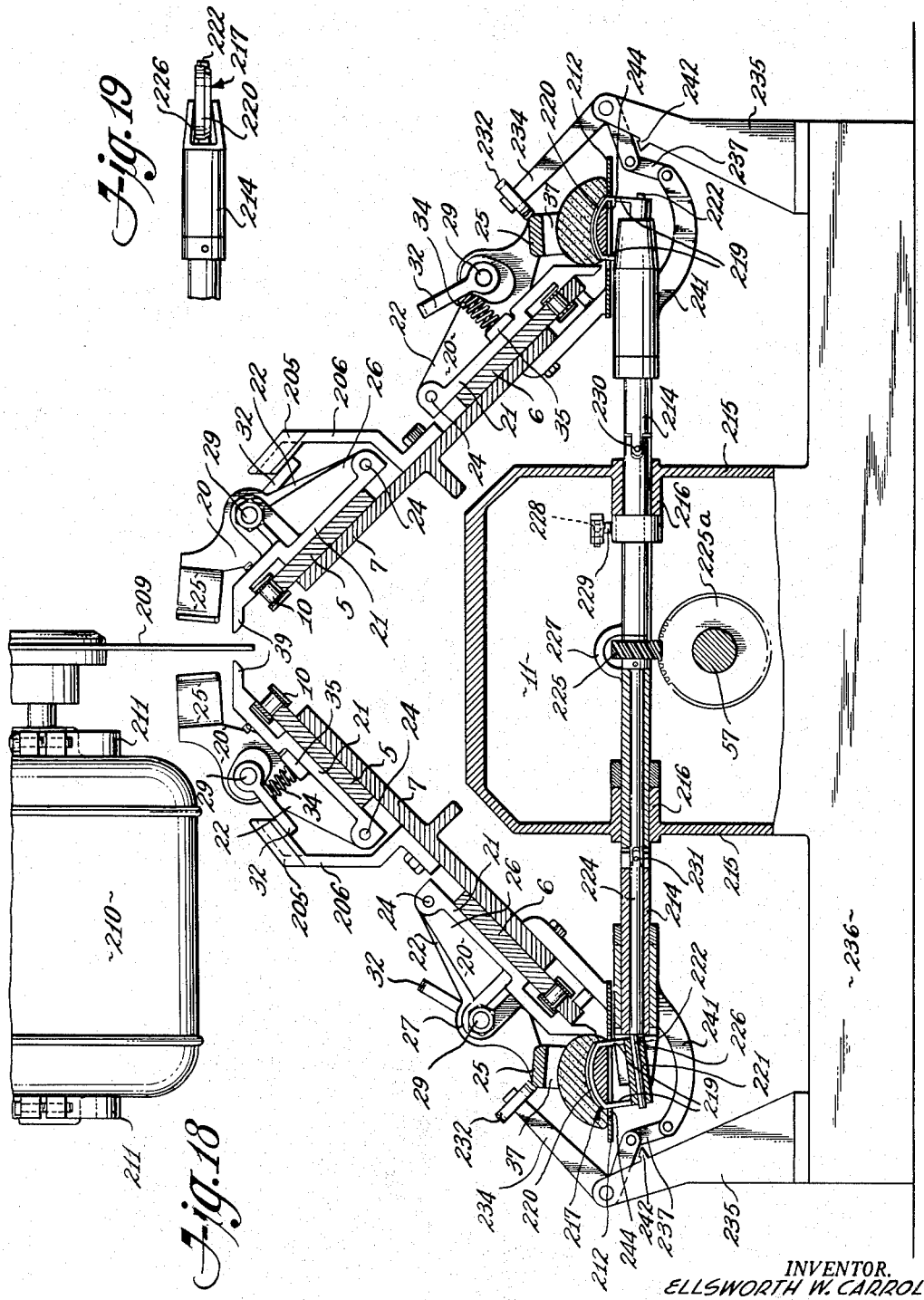
INVENTOR.
ELLSWORTH W. CARROLL
BY
His Patent Attorney April 17, 1956 E. W. CARROLL 2,742,137
FRUIT SORTING DEVICE
Filed May 11, 1951 10 Sheets-Sheet 9

INVENTOR.
ELLSWORTH W. CARROLL
BY Herbert E. Metcalf
His Patent Attorney

April 17, 1956 E. W. CARROLL 2,742,137
FRUIT SORTING DEVICE
Filed May 11, 1951 10 Sheets-Sheet 10

INVENTOR.
ELLSWORTH W. CARROLL
BY Herbert E. Metcalf
His Patent Attorney

United States Patent Office 2,742,137
Patented Apr. 17, 1956

2,742,137

FRUIT SORTING DEVICE

Ellsworth W. Carroll, Redwood City, Calif., assignor to S. & W. Fine Foods, Inc., San Francisco, Calif., a corporation of California Original application June 10, 1949, Serial No. 98,260. Divided and this application May 11, 1951, Serial No. 225,729

2 Claims. (Cl. 198—33)

This invention relates to apparatus for processing fruit having a stem indent and more particularly the invention relates to apparatus for feeding, for orientating as to indent, for orientating as to seam or suture, for inspecting as to orientation, for halving and for pitting peaches and other similarly indented fruit, and particularly peaches suitable for canning.

The various features of the present invention are shown and described herein, for purposes of illustration of the means and method involved, as combined in a unitary machine coordinated to perform continuously the following operation in sequence, entirely automatically, on whole fruit such as peaches:

1. To feed whole peaches in timely relation to the input of the machine in heterogeneous positions.
2. To automatically adjust fruit carriages on the machine to a size related to the size of the peach in the individual carriages.
3. To rotate the peach with relation to and in contact with an orientation member shaped to enter the stem indent of the peach when registry of stem indent and said member occurs, and to change the plane of rotation of the fruit to increase the probability of registry of indent and orientation member.
4. To orientate the fruit with relation to the seam or suture thereon after said member and indent have been registered.
5. To inspect the fruit after the orientation operation and to discard such fruits as are not properly orientated, both as to indent and seam.
6. To saw the properly orientated fruit in half with the plane of the saw passing through the indent and the seam plane.
7. To cut out the half pits from each fruit half.

In the machine described herein all of the above steps are synchronized, so that a continuous flow of fruit is passed through the machine.

Certain aspects of the orientation portion of the machine of the present invention have been shown, described and claimed in my co-pending application, filed September 25, 1947, Serial Number 776,058, of which the present application is a continuation-in-part.

Among the objects of the present invention are:

To provide a machine coordinated to receive an orderly succession of fruit such as peaches and to automatically feed the fruit in heterogeneous positions into the input of the machine in timely relation to fruit carriages adapted to maintain the fruit in a position to be further operated on during passage through the machine;

To provide a means and method of revolving a fruit while in the fruit carriages of the machine with respect to and in contact with an orientation member shaped to fit the indents of the fruits being processed, and to revolve the fruit in such a manner as to attain a high efficiency of indent orientation;

To provide a means and method whereby the indents of the fruit orientated with the indent in a predetermined position are subjected to an operation by a member designed to enter the indent to the fullest extent, and while said operation is being conducted, to provide means for moving the indent fitting member in a manner tending to align the seam plane in a desired position;

To provide a means for probing the fruit indent for the determination of proper seam position thereof and to cause such fruits as may be improperly orientated as to both seam and indent position, to be removed from the machine;

To provide a single, synchronized machine for accomplishing all of the above objects in coordinated sequential relation, with the peaches flowing continuously through the machine;

To provide a relatively simple automatic peach processing machine in which peaches are orientated both as to indent and seam position, inspected to reject improperly orientated peaches with the properly orientated fruit halved and pitted;

To provide such a machine that will efficiently handle either graded for size or ungraded fruit; and To provide these and other objects of the invention as will be apparent from the perusal of the accompanying description of one preferred form of the invention as shown in the drawings in which:

Figure 2 is a side elevational view of the machine of Figure 1.

Figure 3 is a view partly in section, illustrating a loading feature of the aforementioned machine.

Figure 4 is a side elevational view of the loading feature of Figure 3.

Figure 5 is a fragmentary view illustrating a detail of the loading feature of Figures 3 and 4.

Figure 6 is a vertical sectional view of the indent orientation stage taken as indicated by the line 6—6 in Figure 2.

Figure 7 is a top plan view of a portion of the indent orientation stage shown in Figure 6.

Figure 8 is a side view taken as indicated by line 8—8 of Figure 7.

Figure 8a is a cross-sectional view of a portion of an orientation wheel.

Figure 9 is a vertical view partly in section and partly in elevation of a seam orientation mechanism, taken as indicated by line 9—9 in Figure 2.

Figure 10 is a side view of the seam orientation mechanism shown in Figure 9, taken as indicated by line 10—10 in Figure 9.

Figure 11 is a fragmentary plan view taken as indicated by line 11—11 in Figure 9.

Figure 12 is a fragmentary top plan view, taken as indicated by arrow 12 in Figure 10.

Figure 13 is a top plan view taken as indicated by line 13—13 in Figure 10.

Figures 15 and 16 are views in elevation showing the details of an indent probe forming part of Figure 14.

Figure 17 is a top plan view taken as indicated by arrow 17 in Figure 15.

Figure 18 is a vertical view partly in section and partly in elevation of a sawing and pitting mechanism, taken as indicated by line 18—18 in Figure 2.

Figure 19 is a top plan view of a pitting blade used in the device shown in Figure 18.

Figure 1:
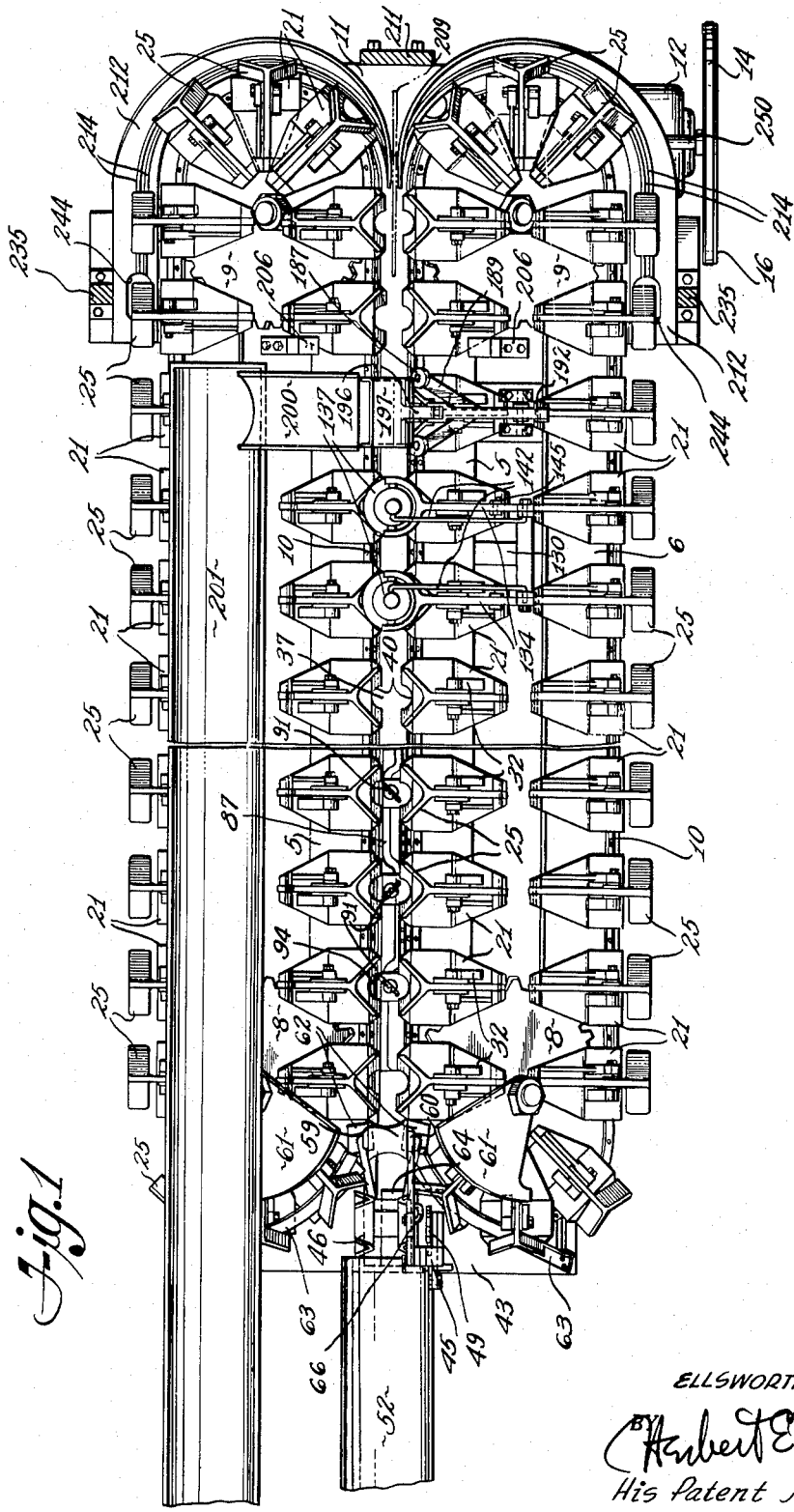
Figure 1 is a plan view illustrating the general relationship of the various features of the machine.

*Main elements and stages of the machine*

Before entering into a description of the details of the various mechanisms utilized in the various stages of the complete machine shown in the drawings, the main elements thereof as particularly shown in Figures 1 and 2 will first be described.

The machine illustrated is of the endless carrier type in which a plurality of fruit carriages are continuously progressed over a frame supported on frame legs 2.

The frame comprises an upper chain bar 5 and a lower chain bar 6 tied together by end crossbars 7 and held at 90° to each other and at 45° to the ground level, as best shown in Figure 18.

At the ends thereof each chain bar is cut away to receive an idler sprocket 8 at the front end of the machine, and to receive a drive sprocket 9 at the rear end, these sprockets being positioned to guide an endless roller chain 10 in a position to ride along the top edge of each upper chain bar 5 and along the bottom edge of each of the lower chain bars 6. The two drive sprockets 9 are driven from a gear box 11, which is supplied with power from electric motor 12 through belt 14, motor pulley 15 and gear box pulley 16.

A plurality of fruit holding carriages are formed from opposed carriage halves oppositely positioned on and attached at uniform intervals to the roller chains 10, and progressed by them along the chain bars.

The carriage halves are separated as they pass along the lower chain plate 6 and then rise to approach each other as a loading stage I–A is reached prior to progressing horizontally along the top of the upper chain bars 5. The stages are best shown in Figure 2.

At the loading stage I–A the fruit is loaded in proper sequence into the fruit carriages formed by the opposite carriage halves now in position to retain the fruit, and if the fruit being processed is ungraded a fruit carriage sizing means is operated as the fruit is loaded into the carriage. This stage will later be described in detail.

After a peach is loaded into a carriage, the carriages are progressed to enter into an indent orientation stage extending from A to B in which the fruit are revolved by frictional contact with power driven wheels mounted on a sub-conveyor, so that during the orientation stage the fruit will be rotated at all times except when a wheel registers with the stem indent. This registry prevents further driving contact with the fruit so that the fruit stops rotating, with the indent down. During the passage of fruit through stage A–B the orientation wheels are changed in rotational plane, preferably rapidly, to increase the probability of indent registry with the wheel.

After the wheels are removed from beneath the fruit by termination of the sub-conveyor, the carriages pass through a seam orientation stage B–C. While the fruit is in this stage a member having an indent fitting head is applied to the fruit from below and travels with the fruit, oscillating meanwhile to settle the fruit to its deepest extent on the head and thereby orientate the fruit as to seam or suture plane. As the carriages pass out of the seam orientation stage B–C, the heads return quickly to orientate the following fruit as to seam plane. The fruit then enters an inspection stage C–D.

In this stage C–D, a pilot is inserted into the stem indent, this pilot having a feeler on the upper end thereof sensing the shape of the indent. If the feeler is not operated, due to an improperly orientated indent being presented to it, or due to no indent at all being entered, the fruit is raised by the pilot, and means are provided to remove the peach from the carriage and from the machine. Assuming that the inspection has found a properly orientated fruit to be present in the carriage, the fruit is carried next to a halving stage D–R, the position sensing pilot returning to inspect the fruit in a following carriage.

As the fruit enters the halving stage D–E, the halves of the carriage are released so that the peach is gripped by the carriage halves, and a rotating circular saw cuts through the vertical central plane of the peach as the carriage progresses. When the peaches are properly oriented, the cut is made through the tip-indent axis and in the plane of the seam, thus providing substantially identical fruit halves.

At the end of the halving stage D–E, the cut surfaces of the peach are close together and vertical. The peach halves are then passed into a peach half separation and turning stage E–F, in which the fruit halves are widely separated but are still progressed by the individual carriage halves to a position in which the cut surfaces of the fruit halves are horizontal and facing downwardly. The fruit halves then pass through a pitting stage F–G, during which the cutout peach pit portions are removed from the half and discharged. The pitted half is then separately discharged and the carriage halves then return along a return stage G–I to rise again and approach each other to receive a whole fruit in the loading stage I–A.

The details of each stage, operating as set forth above, will next be described.

*Fruit carriages*

The details of one form of adjustable carriages are shown in Figures 1, 2, 4, 9, 14, and 18. Each carriage comprises a pair of carriage halves 20 attached to chains 10 opposite each other. Each carriage half 20 comprises a flat carriage plate 21 attached at one end to roller chain 10 to slide over upper and lower chain bars on the outside edges thereof. At the other end of the carriage plate 21, a central ribbed arm 22 extends upwardly from a pivot pin 24 on carriage plate 21 to terminate a V-shaped pair of fruit restraining fingers 25 extending substantially horizontally when the carriage base plate 21 is on an upper chain bar. Also extending upwardly from the bottom of carriage plate 21 is a solid arm 26 terminating in an enlarged end 27 from which a locking screw 29 is extended horizontally fore and aft to pass through an arcuate slot 30 in central ribbed arm 22. Locking screw 29 has a threaded end screwed into enlarged end 27 of solid arm 22 and outside of slot 30 the screw 29 is provided with a locking lever 32. The relationship of locking lever 32, ribbed arm 22, and solid arm 25 is such that upward pressure exerted by a locking spring 34 bearing against locking lever and carriage plate 21, and held in place by a plate boss 35 and a lever boss 36, causes the ribbed arm 22 to be firmly locked to the solid arm 26. The threads on screw 29 are coarse, so that a very slight downward movement of the end of locking lever 32 will unlock ribbed arm 22. When pressure on lever 32 is released, spring 35 will relock the ribbed arm 22. The weight of the fruit is such that when the ribbed arm is unlocked, the arm and fingers will fall toward the carriage plate by gravity. When two half carriages are opposed to hold a fruit therebetween, the width of the space between the opposed finger pairs can be changed, and the arms locked in any position desired. Thus, fruit differing materially in size can be accommodated between opposed finger pairs, with proper spacing so that fruit between the finger pairs can be freely revolved.

The space between finger pairs 25 during passage of the fruit along the machine will be termed a fruit restraining space 37.

The restraint of the fruit from below is provided by a base plate 39 extended from each carriage plate 21 toward the vertical longitudinal central plane of the machine V. P. These base plates 39 are substantially horizontally positioned beneath finger pairs 25 and are centrally provided with central cut out portions 40 for the insertion of various devices from below into the restraint space 37 above opposed base plates.

As will be seen later, the control of the size of the restraint space 37 between carriage halves can be made automatic, either for running graded peaches where the restraint space is kept uniform in size except for a gripping of the peach just prior to sawing; or for running ungraded peaces where the position of the finger pairs in each carriage half of a carriage assembly is individually changed to provide the proper size of restraint space for free revolution of a peach being loaded into the particular restraint space.

*Loading stage 1–A*

Loading of the peaches is accomplished by the mechanism particularly shown in Figures 3, 4, and 5, taken in conjunction with Figures 1 and 2.

An upright 45 is erected from a frame plate 43 joining legs 2 at the input end of the machine, and carries a star wheel 46 rotatable in the central vertical plane V. P. on wheel pin 47. Attached to star wheel 46 is a ratchet 49 having eight teeth 50 thereon. The star wheel 46 has four pockets 51 and is placed at the end of a sloping feed chute 52 in which the peaches to be run are stacked, the chute being fed from a hopper (not shown) with the fruit in heterogeneous positions as to indent.

The star wheel 46 is rotated by reciprocation of a pawl lever 54 having a pawl 55 mounted thereon engaging teeth 50 on the ratchet 49. Lever 54 is reciprocated through rod 53 by crank 56 (Figure 2) mounted on the end of a lower longitudinal shaft 57 extending forward from gear box 11 at twice machine cycle speed so that a peach rolling from feed chute 52 into a star wheel pocket 51 will be rotated first, one eighth of a revolution to a position in contact with an upper dished roller 59 mounted on a swinging roller arm 60 attached to the top of upright 45, this position being shown in Figure 5, and then by another eighth revolution to a position where the fruit will drop by gravity from the star wheel 46 into the restraint space 37 formed by the opposed finger 25 pairs on carriage halves 20 coming up on the chains 10 to the beginning of the horizontal path on the machine frame.

As the carriage halves 20 rise vertically at the input end of the machine, these halves are preferably automatically and individually adjusted for the size peach being loaded when ungraded fruit is being processed.

These carriage halves are first unlocked by a loading cam 61 positioned on each side of the input end of the machine bearing against locking levers 32 on each carriage half shown in Figures 1 and 2. The carriage halves are held unlocked by the loading cam as they rise toward the loading location. As pointed out in the prior description of the carriage halves 20, the restraining finger pairs 25 on each carriage half will fall toward each other by gravity when the ribbed arms are unlocked so that as these carriage halves near the loading position they will have minimum spacing between opposed finger pairs. As the carriage halves 20 rise, in unlocked condition, they are opened to a maximum extent by a fixed opening cam 63.

Just prior to the loading position the distance between finger pairs is controlled by the position of a pair of opposite adjusting cams 62 which begin as opening cams 63 end. Each cam 62 is positioned to bear against a lower and inner surface of a ribbed arm 22 on a carriage half after the ribbed arms leave the opening cams 63. Both adjusting cams 62 are supported by a cam lever 64 pivoted on pin 65 on the lower portion of upright 45. The ribbed arms 22 of the carriage halves, it has been seen, are not vertical, but slope upwardly toward the central vertical plane V. P. of the machine and when released by opening cams 63, come to rest on adjusting cams 62. The vertical position of adjusting cams 62 is determined by a rod connection 66 between cam lever 64 and dished roller arm 60.

As the dished roller arm 60 is lifted to pass over a peach rotated by star wheel 46, this arm 60, through rod connection 66 and cam lever 64 lifts adjusting cams 62 which in turn position the opposed finger pairs 25 on the carriage halves as they leave the opening cams 63 the proper distance apart for the size of the peach about to be loaded. As the carriage halves are about to leave adjusting cams 62, the loading cams 61 (Figures 1 and 2) terminate, and the springs 34 on the carriage halves operating on loading levers 32 lock the finger pairs in the position in which they were placed by the action of adjusting cams 62.

In case graded peaches are being run through the machine, rod connection 66 may be removed and the adjusting cams 62 held in the same position for all carriages by setting a cam lever positioning screw 67 to hold the adjusting cams 62 in a constant fixed position as determined by the average size of the peaches being processed. For ungraded peaches positioning screw 67 can be set to hold the restraint space to a predetermined minimum, or removed, if desired. Thus, the carriages can all be adjusted to have the same restraining space, or can be individually adjusted as to restraint space in accordance with the size of the peach being loaded.

*Indent orientation stage A–B*

After the peaches have been loaded into the carriages and the restraint spaces, they pass directly into an indent orientation stage, the details of which are shown in Figures 6, 7, 8, and 8a. This stage takes up four carriage lengths on the conveyor.

In this indent orientation stage, a subconveyor frame 70 is supported from the upper chain bar 5 by subconveyor frame brackets 71, through lower adjustment screws 72 that can be changed in length to adjust the height of the subconveyor frame, as shown in Figure 6. This frame comprises two vertical U-shaped side channels 74 and 75 facing each other to form a support for a cam track block 76 extending horizontally across the machine between and joining the channels 74 and 75 and slightly below the top of these channels. An endless subconveyor chain 77 progresses around the cam track block 76 above and below this block, this chain being mounted on end sprockets 77a fastened on front and rear cross shafts 79 and 80, respectively.

Six to eight wheel blocks 81 are attached to subconveyor chain 77, these wheel blocks riding, when on top of the cam track block, on lateral shoulders 82 of the cam track block 76, and when returning underneath the cam track block 76, the wheel blocks 81 ride on the lower inturned edges of the opposed side channels 74 and 75. The wheel blocks 81 are spaced carriage distance apart, and are arranged on the subconveyor chain 77 to travel centrally beneath the carriages as they progress along the horizontal path of the carrier.

Each wheel block 81 supports a wheel pivot 84 extending upwardly when the blocks are on the upper side of the cam track block 76, this pivot 84 extending through the wheel block to join a roller arm 85 having a downwardly projecting roller 86 on the end thereof. Each roller fits and rides in a cam track 87 grooved into the upper surface of the cam track block 76 and extending the full length thereof, with several changes of direction, as will be later described.

The upper end of each wheel pivot 84 is forked and is crossed at the end thereof by a wheel pin 90 on which an orientation wheel 91 is mounted to rotate freely. A portion of a wheel 91 is shown in section in Figure 8a.

The periphery of each orientation wheel 91 is sloped toward the central plane of the wheel, and one side of the wheel is provided with bevel gear teeth 92 cut thereon, these teeth at their outer ends conforming to the slope of the wheel sides.

At one side of the wheels 91, parallel to their direction of movement when on top of cam track block 76 is positioned a pinion wire 94 having longitudinal teeth 95 thereon. This pinion wire 94 is journalled in end bearing 96 and is positioned just below the base plates of the carriage halves on one side of the machine, with the pinion wire axis on the same level as that of the apex of the orientation wheels 91.

Pinion wire 94 is rotated by a pinion wire chain 97 engaging a pinion wire sprocket 99 positioned at the forward end of the pinion wire. The pinion wire chain 97 extends downwardly to pass around a shaft sprocket 99 on longitudinal shaft 57 which drives the crank 56 for rotation of star wheel 46 (see Figure 2).

As shown in Figure 6, the subconveyor chain 77 is driven by pins 100, extending downwardly from the main roller chain 10 on the side of the machine opposite the pinion wire, these pins 100 being properly spaced on chain 10 to engage each wheel block 81 and progress the wheel blocks along on the subconveyor at the same rate of speed as the carriages.

As the carriages progress, and enter the orientation stage A–B, the orientation wheels 91 rise at the beginning of the subconveyor frame, and enter the spaces between carriage base plates 39 in the cutouts 40 therein provided and project into the restraint spaces in which the fruit is held. As the orientation wheels 91 reach the vertical plane, the cam rollers enter the cam track 87 which, through the roller arms 85 connected to the wheel pivots 84 control the vertical plane positions of the orientation wheels.

The cam track, as the rollers 86 enter it, is provided with an entrance flare 101 to facilitate entrance of the rollers. Arms 85 extend outwardly from pivots 84 in the plane of the wheel.

As the rollers enter the track, the rollers trail with the wheels in the central vertical plane V. P. of the machine. The cam track 87 then moves to one side of the cam track block 76 in a position where the teeth 92 on each wheel are forced into engagement with the longitudinal teeth 95 on the pinion wire 94 which is constantly rotating. This engagement causes the wheels to rotate in a vertical plane 45° to the central vertical plane of the machine. The fruit, resting on a wheel, is thereby rotated unless and until a wheel enters the stem indent of the fruit. At this time rotation of the fruit will cease even though the wheel on which the fruit is resting is still rotating, as the fruit will be lowered by this registry of wheel and indent and at least part of the weight of the fruit will be taken by the base plates 39 on each side of the wheel.

In any event, as the carriages, fruit, and wheels progress, the cam track 87 is changed in direction on the cam track block 76 and is moved over to the other side of cam track block 76. The rollers, trailing in the cam track, follow the direction change thereof, and flip the wheels into a new vertical plane 90° away from their former positions into a position where the wheel teeth 92 again engage the pinion wire teeth 95, but on the opposite side of the orientation wheel. The wheel then rotates in the opposite direction. The rapid change in the vertical rotation plane of the wheels, with direction reversal, greatly increases the probability of the indent of a fruit registering with the orientation wheel. In the preferred example shown, several wheel plane changes are made while the wheels are projecting into the restraint space 37 between the carriage halves. In this same preferred example, the wheel is about 1¼ inches in diameter, ¼ inch thick near the periphery, and is rotated about 260 R. P. M. by the pinion wire when the carriages are being progressed at a rate of 60 per minutes past a given point.

As some of the peaches may have their indents come to a registry with a wheel at the very beginning of the orientation stage, subsequent wheel plane shifts also aid in seam orientation, particularly with respect to those fruits whose indents are of proper size to fit the wheel so that a substantial weight of the peach still rests on the base plates, but the indent fits the wheel after wheel and indent registry occur close enough to turn the fruit in the V. P. The inertia of the peach permits the wheels to shift their plane without always moving the peach and during this relative movement of wheel and indent, the wheel plane and seam plane may coincide. When this happens, the peach settles still further on the wheel, so that the wheel plane and seam plane substantially conicide as the wheel will penetrate to its maximum extent when such coincidence occurs. For this reason, it is preferred that the cam track 87 be ended with a short end section 102 which places the wheel plane in the central vertical plane V. P. of the machine as the wheels leave the carriages.

At the end of the indent orientation stage A–B the majority of the fruit will be properly orientated with the indent down. However, as not all of the fruit will be orientated as to seam or suture with the suture plane coinciding with the central vertical plane V. P. of the machine, it is desirable to pass the fruit through a seam orientation stage B–C.

*Seam orientation stage B–C*

The seam orientation stage B–C operates to orientate peaches that enter the stage with their indents down, into a position where the seam or suture plane through the fruit lies substantially in the central vertical plane V. P. of the machine.

In making this seam plane orientation, full advantage is taken of the fact that the stem indent is longer in the plane of the seam than it is in any other plane, so that an elongated member shaped to enter the stem indent to its full depth when registered with the seam plane and with substantially all of the weight of the peach thereon will not enter the indent to the same depth in any other plane. Advantage is also taken of the fact that such an indent fitting member, once having been entered into the indent to the fullest extent possible, tends to stay there when rotated, whereas when such a member is rotated with respect to a peach indent in any other relationship thereto than full penetration, relative rotation of the peach and member can take place. Thus by presenting an elongated indent member generally fitting the indents of peaches to the indent of each peach and rotating the peach and member relative to each other in horizontal planes, the member seeks and finds the deepest penetration in the indent by this relative movement. When such deepest penetration is achieved, i. e., when the longest dimension of the member is in the seam plane of the fruit, the member and peach rotate together and the seam plane remains orientated with respect to the member. Then, by stopping the rotation of the member in a predetermined position with respect to the machine and withdrawing the member, the peach will be left in the machine with the indent down and with the seam plane in the predetermined position desired.

In Figures 9, 10, 11, 12, and 13, a seam orientation mechanism is shown in detail for orientating the peaches passing through the machine to place their seam planes in the central vertical plane V. P. of the machine. This stage takes up three carriage lengths on the machine.

Referring first to Figures 9 and 10, a seam orientation block 105 is mounted to slide centrally and longitudinally of the machine below and between carriage halves, being reciprocated over a horizontal path covering 1⅔ carriage length by a horizontal reciprocation rod 106 (Figure 12) operated from the ½ time shaft 251, as will be later described, through rod pin 107 attached to the rear end of orientation block 105. Laterally and vertically, the orientation block 105 is maintained in position by guides 109 entering grooves 110 in the orientation block 105, the guides 109 being bolted to opposite upper chain bars 5 of the machine, as best shown in Figure 9.

The orientation block 105 is reciprocated along the machine at carriage speed, with a quick return at the end of the path so that the fruit in two carriages can be simultaneously operated on for seam orientation just after the fruit has left the indent orientation stage A–B.

A pair of longitudinally spaced rod bosses, a front boss 111 and a rear boss 112, project upwardly and centrally from orientation block 105 and each boss and the block is bored to receive and journal a vertical seam rod 114 extending through the block to terminate well below it.

Between the lower projections of seam rods 114 a pair of slide pins 115 extend downwardly from orientation block 105 and are connected together by a cross bar 113 at the bottom thereof below the ends of seam rods 114. Mounted on slide pins 115 is a vertical slide 116, this slide being reciprocated by a slide rod 117, operated from gear box 11, as will be described later.

Slide 116 is provided with fore and aft lugs 119 extended therefrom and bored to receive seam rods 114. Immediately above lugs 119 each seam rod 114 is provided with a pinned washer 120, and immediately below each lug 119, each seam rod is provided with a small sprocket 121 pinned to each seam rod 114, these sprockets being connected by a sprocket chain 122.

Thus both seam rods 114 will be vertically reciprocated in the orientation block 105 by vertical reciprocation of vertical slide 116 by slide lever 117. Also as both seam rods are connected together by chain 122, any rotation imparted to one seam rod will cause the other seam rod to rotate as well.

When slide 116 is in its lowest position the upper ends of seam rods 114 are close to the top of bosses 111 and 112 and each seam rod is provided with an upper indent fitting tip 124.

This tip 124, best shown in Figures 9, 10, and 12, has a roughly diamond shaped base 125 elongated in one dimension, with sides 126 slanting upwardly to a central cutout 127 which is present so that if a small portion of a peach stem 129 (Figure 9) remains in the bottom of an indent this small piece of stem will enter the cutout 127 so that it will not prevent deep penetration of the tip 124 into the indent. Except for the cutout 47, the tip 124 resembles the indent fitting portion of an orientation wheel 91, and the tip has the same relative dimensions as the indent fitting portion of the wheels 91, both as to length and thickness.

The front and rear surfaces of the indent fitting tip 124 also slope upwardly toward the cutout 127 and are rounded, so that the shape of the tip is such as to fit deeply into a peach indent only when the elongated indent registers with the long dimension of the tip in exactly the same manner as the tops of wheels 91 registered with the indent for seam orientation in the previous stage. When such registry occurs, the position of the peach is determined by the position of the tip, as under these conditions both tip and peach will rotate together. When not operating on a peach, indent fitting tips 124 are below the level of the base plates 39 of the carriage halves, so that the orientation block 105 can be reciprocated in the opposite direction to carriage travel.

As the carriages leave the indent orientation stage A—B the seam block is timed to place the indent fitting tips 124 centrally beneath two carriages, and after the seam block motion is synchronized with the carriage motion, the vertical slide 116 is raised by slide lever 117 to raise the seam rods 114 so that the indent fitting tips 124 pass through the cut outs 40 in base plates 39 of the carriage halves, and push upwardly against the lower surface of the fruit in the carriages. In most instances the indent fitting tips 124 will contact the indents of the fruit, as the majority of the fruit will have been orientated by the previous stage with the indent down. The tips 124 are raised a sufficient amount so that they can penetrate to the deepest extent into the indent of the fruit being processed by the machine, with the weight of the peach entirely resting on the tip.

In order that the fruit be not merely rolled sidewise in the restraint space between the finger pairs of the carriage, fruit centralizing devices are utilized as shown in Figure 9.

Two centralizing devices are provided, one over each seam rod. Each centralizing device consists of a bracket 130 bolted at its lower end to orientation block 105. This bracket extends outwardly between the chain bars and then extends upwardly. At about the average level of the tops of peaches in the carriages, a cap lever 134 extends back toward the central vertical plane V. P. of the machine, this lever being connected by pivot 135 to bracket 130 for rotation in a vertical plane. Near the end of cone lever 134 a horizontal fork 136 is provided, this fork rotatably supporting a hollow cone 137 dimensioned to receive about the top third of a peach. Cone 137 floats, rotates freely and is movable vertically in a cone base 139, being held therein by cone shoulder 140 and retaining ring 141. The central axis of cone 137 is maintained vertical by a positioning rod 142 journalled at one end in a central cone base lug 144 and at the other end in the terminus of bracket 130, the rod 142 being positioned parallel with cone lever 134.

The cone 137, resting on the peach, maintains the fruit vertical while being lifted by a seam rod 114, yet does not interfere with vertical movement or rotation of the peach.

The position of the cone 137 over the peach is under the control of a vertical control rod 145 pinned to the cone lever 134 near the attachment of the latter to bracket 130, the control rod 145 extending between the chain bars to be rotatably attached to a lifting lever 146 pivoted to the extension 147 of cross bar 113. One lifting lever 146 is positioned at one side of extension 147, the other lifting lever being positioned on the other side of the extension 147 so that the inner end 149 of each lifting lever will be in a position to contact the lower end of a seam rod, as shown in Figure 10.

The result of the action of the linkage just above described, is that as the two seam rods rise to contact the fruit, the two cones are lowered on to the top of the two fruit being operated on by the indent fitting tips 124. When the seam rods are lowered, the cones are raised above the fruit to clear the fruit, as the orientation block is being returned.

Assuming that the fruit indent contacted by an indent fitting tip is not properly orientated with the seam plane in the plane of the long dimension of the indent fitting tip, the indent fitting tips are oscillated away from and back to the central vertical plane position in order that the indent fitting tips 124 is provided for by the use of register more deeply with the indent. This oscillation of the indent fitting tips 124 is provided for by the use of a rod pinion 150 mounted on each seam rod 114 immediately below orientation block 105 and pinned to the seam rods as best shown in Figure 10.

Rack brackets 151 are dropped down from one slide 109, these rack brackets supporting a rack 152 having a forward set of teeth 154 spaced from a rear set of teeth 155, both sets of these teeth being positioned to mesh with rod pinions 150 only when vertical slide 116 and the seam rods 114 are raised. (See Figure 13.)

The rack 152 is positioned to intersect the leading pinion 150 just after the seam rods have been raised and are travelling rearwardly at the same speed as the carriages with the indent fitting tips 124 in contact with the peaches in the overhead carriages.

This engagement of the leading pinion rotates this pinion, the leading seam rod, and, by virtue of the sprocket chain 122, the trailing seam rod and tip also. The angular rotation of the rod and tip will be determined by the number of teeth on the rack, but an initial rotation of approximately 30° to 80° away from the central vertical plane V. P. may be utilized, with a total rotation of from 60° to 160°. In many instances an initial rotation of about 45° with a total rotation of about 90° has been found satisfactory.

An opposite intermediate rack 156 held by rack bracket 157 extended from the opposite upper chain bar 5 is provided, this rack 156 being positioned between front and rear teeth 154 and 155 respectively, to engage pinions 150 to rotate the rod and tip in the opposite direction.

As the leading rod pinion 150 leaves the rear teeth 155 of the rack 152, the trailing pinion 150 then engages the front teeth 154 and the rotative oscillation of the tips is repeated, thus providing three chances for the tips 124 to register with the seam indent, which have been found sufficient to orientate a major proportion of the fruit with the seam plane aligned with the major extent of the indent tips 124.

After the trailing pinion 150 has cleared the rack 152, it has been found desirable to vibrate the indent fitting tips 124 to insure the most exact registry possible of tip and indent. This is accomplished by supporting a stationary vibration rack 159 on the end of and below the level of rack 152 in a position to engage a vibration block 160 pinned to the trailing seam rod 114 just below trailing pinion 150, this vibration block having vibration rollers 160a spaced a distance of 3½ teeth apart thereon, running over the teeth on vibration rack 159, as shown in Figure 11, to impart an escapement type of rapid and short rocking motions to the attached seam rod and indent fitting tip, and also, through chain 22 to the leading seam rod and tip. This short period of indent fitting tip vibration greatly aids in the final precise alignment of indent and tip.

As soon as vibration has ceased, the vertical slide 116 is lowered by slide lever 117, leaving the peaches again resting on the base plates 39 of the opposed carriage halves. As the indent fitting tips 124 approach the orientation block 105 they are accurately aligned in the central vertical plane V. P. of the machine by being lowered between two positioning pins 161 on the top of the seam orientation block 105. When indent fitting tips 124 have been lowered below the level of the base plates 39 of the carriage halves, the seam orientation block 105 is rapidly moved forward to repeat the seam orientation cycle on the peaches in the two following carriages.

*Inspection stage C–D*

The inspection stage C–D of the machine is shown in detail in Figures 14 to 17, inclusive.

While the seam inspecting device previously described operates on two peaches at a time, the fruit can be inspected quickly and accurately with a single indent inspection probe mounted to operate on the fruit immediately after the peaches have left the seam orientation stage.

The indent probe 165 is a composite body extending vertically in the central vertical plane V. P. of the machine and mounted for vertical movement in a probe block 166 which in turn can be reciprocated horizontally along the path of the fruit by means of reciprocating power rod 167 connected to probe block 166 by end connection 168 and operated from the gear box 11 as will be later described. The probe 165 is mounted to be moved along with the fruit carriages at fruit carriage speed with the probe 165 centrally positioned with respect to the fruit in the carriages and below the fruit. The movement covers a distance of approximately ⅔ or ¾ of the center to center spacing between two carriages, allowing the remaining time for the return. The probe block 166 slides for such movement on lateral flanges 169 riding on probe block guides 170 attached to the upper chain bars 5.

Block 166 is reciprocated by the reciprocating power rod 167 from the cyclic shaft 250 through the cam 269 (Figure 21) and parts 270, 271, 272.

The indent probe 165, as before stated, is composite and comprises a main vertical body member 172 which can slide vertically in a sleeve 174 attached to block 166.

Main body member 172 terminates upwardly in an indent pilot 175. This indent pilot is positioned to extend in the central vertical plane V. P. of the machine, and the pilot is elongated in that plane to fit and enter the stem indent of a fruit when this indent is down and is in a position placing the seam plane of the fruit substantially in the central vertical plane V. P. of the machine.

Positioned at right angles to the indent pilot 175 and slideably mounted on the top of the main probe body member 172 is a plate-like inspection tip 176 having laterally extending portions 177 sloping upwardly to the level of the top of the center of the indent pilot 175 so that from above the two tips form a cross having side members sloping downwardly from the center thereof, as shown in Figure 17.

Inspection tip 176 as above stated, is slideably mounted on the top of main body member 172 and terminates below in a pin 178 pivoting the tip 176 to one end of a cross lever 179 pivoted on body member 172. The other end of cross lever 179 is pivoted to a downwardly extending rod 180 connected to a bell crank pawl 181 having its lower end engaging in one position the top of a probe slide 182 vertically movable along the bottom of body member 172 by probe slide rod 184 driven from gear box 11.

In another position, pawl 181 is withdrawn into body member 172, and in this latter position the probe slide 182, when reciprocated vertically, does not move the main body member 172. However, when pawl 181 is extended by a light spring 183 to engage the top of probe slide 182, the main body member moves upwardly as the probe slide 182 rises.

Figure 14:
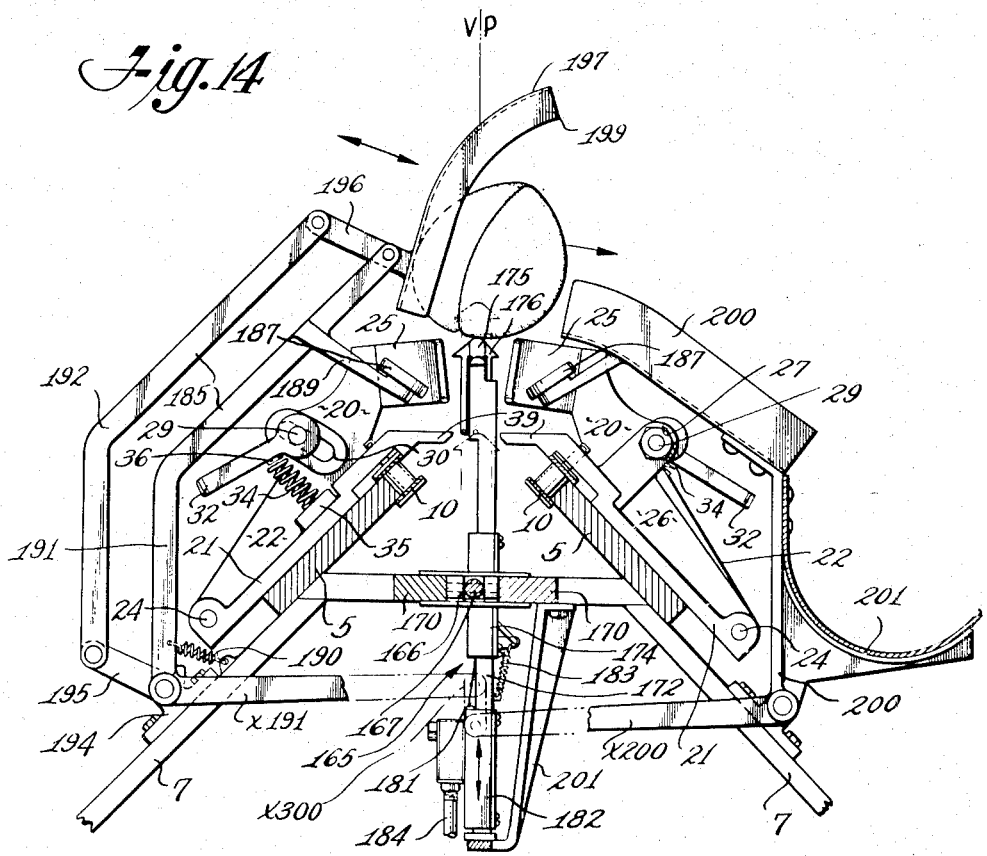
Figure 14 is a vertical view partly in section and partly in elevation of an inspection stage, taken as indicated by line 14—14 in Figure 2.

As the probe block 166 moves forward rapidly toward the input end of the machine, the probe slide 182 holds the indent pilot 175 and the inspection tip 176 below the base plates 39 of the carriage halves. As the fruit is carried along by the carriages, the operation of the probe is timed so that it meets a carriage just leaving the seam orientating stage B–C, and the probe block 166 starts to move at the same rate of progression as that of the fruit and in the same direction. At the same time, the probe slide 182 is raised rapidly, the upper end of the probe passing through the cutouts 40 in the base plates 39 of the carriage halves as shown in Figure 14.

If the fruit in the carriage being probed has the indent thereof down and the seam plane in the vertical central plane V. P. of the machine, as the probe rises the indent pilot 175 will enter the indent but the top of the inspection tip 176 will contact the sides of the indent. As the probe continues to rise into the indent, the inspection tip 176 is held stationary, and the main body member 172 ceases to rise because the relative movement of the indent pilot 175 and the inspection tip 176 has caused the pawl 181 to be withdrawn into main body member 172. After this happens, the probe slide 182 continues to rise but the probe remains stationary. Thus, when the indent is in the proper position the fruit between the carriage halves is not disturbed, and remains between the carriage halves to be moved to the next stage of the machine.

However, if the indent fitting tip contacts the surface of a peach away from the indent, or should enter an indent which is down but which is turned so that the seam plane is not in the central vertical plane V. P. of the machine then no contact of the peach will be made with the inspection tip 176. In this case the pawl 181 will remain extended and the probe continue to rise with the probe slide 182, forcing the fruit upwardly.

The length of the probe is such that at the top of the probe slide stroke, the peach will be lifted just above the upper level of the finger pairs on the carriage halves. At this point a peach that has been raised is ready for ejection from the machine. Ejection is accomplished by an ejection mechanism best shown in Figure 14.

The ejection device comprises a pantograph frame 185, positioned on a cross plate 7 between upper and lower chain bars in a position opposite to that position where a fruit is raised to its upper limit by the probe. This frame 185 is free to move inwardly under the control of a pair of rollers 187 spaced by a frame fork 189 and also under the urge of a frame spring 190. Rollers 187 are positioned to contact and bridge a finger pair 25 of a carriage half on one side of the machine, so that the pantograph frame 185 will be moved away from the central vertical plane V. P. of the machine when one roller rides up on the advancing finger of a finger pair. The frame will move toward the central vertical plane of the machine after the rollers have bridged a finger pair. The pantograph frame 185 is thus cammed laterally by roller contact with the advancing finger of each carriage half on the pantograph frame side of the machine.

The pantograph frame 185 comprises an inner arm 191 to which frame fork 189 is attached, and an outwardly spaced arm 192 of parallel extent. Inner arm 191 at its lower end is pivoted to a short pivot boss 194 on the cross plate 7 and the outer arm 192 is pivoted on a longer pivot lug 195 on cross plate 7. The top ends of the inner and outer arms 191 and 192, respectively, are pivoted to an ejection plate arm 196 to which is attached an ejection plate 197 facing the opposite side of the machine and having fore and aft vertical flanges 199. The pantograph frame 185 is adjusted to give the ejection plate 197 a substantially horizontal motion when a roller 187 first contacts a finger and rides toward the finger junction. After the finger junction is passed, the rollers permit movement of the pantograph frame 185 inwardly toward the central vertical plane V. P. of the machine.

This movement causes ejection plate 197 to move across the restraint space between the finger pairs and is timed to take place when the probe 165 has reached its highest point when carrying a peach upwardly in the restraint space. At this time and in this position, the peach is contacted by the inwardly moving ejection plate 197 and is forced laterally past the central vertical plane of the machine into an opposite discharge chute 200 which is also pivoted to cross plate 7 and provided with spaced rollers 187 similar to those attached to the pantograph frame. The peach rolls down chute 200 into a longitudinal discharge channel 201 which extends to the end of the machine frame as shown best in Figure 1.

Thus, any peaches not properly orientated both as to indent and seam position are removed from the machine before reaching the sawing stage to follow.

As peaches which are properly orientated are not lifted by the probe, the ejection plate 197, in moving across the restraint space, does not disturb such a properly orientated peach below it. These peaches remain in the carriages to enter the sawing stage.

On the downward stroke of the probe slide 182, the main body member 172 contacts the bottom of a positioning bracket 201 attached to one probe block bracket 170, so that the rocking pawl 181 will always be returned to its outward position at the end of the stroke.

*Sawing stage D–E*

After the carriages leave the inspection stage C–D only those peaches remain in the carriages which have their indents down and which also have their seam plane in the central vertical plane V. P. of the machine. These peaches, as far as position is concerned, are now ready for sawing but are only loosely held in the carriages. In order that they may be grasped firmly by opposite finger pairs 25, an unlocking cam 205 on each side of the machine is held in the path of the locking levers 32 on each carriage half, these cams 205 being mounted on cam brackets 206 erected from cross plates 7 between the two chain bars 5 and 6, as shown in Figures 1, 2, and 18, and are positioned to unlock the carriage halves just before these carriage halves leave the rollers 187 attached to the pantograph frame 185 and to chute 200. As the carriage halves pass the unlocking cams 205, the locking levers 32 are depressed to unlock the ribbed arms 22 and these arms, and the attached finger pairs, fall by gravity and under the urge of roller 87 toward the central plane of the machine and against the peach between the finger pairs, each finger pair stopping when contact with the peach is made. The peach is centralized by the finger pairs which are in this position linked together through rollers 187 on the pantograph frame 185 and chute 200, the latter two elements being linked through horizontal levers X191 and X200 respectively, the inner ends of the latter levers being connected by vertical link X300, as shown in Figure 14. After this happens, locking levers 32 pass off unlocking cams 205 and the finger pairs are locked against the peach. Thus, the peach is firmly grasped between the finger pairs, with the seam plane in or very close to the central vertical plane V. P. of the machine.

After the peach has been grasped and the carriage halves locked, the peaches are progressed past a central, vertically positioned circular halving saw 209 driven by a saw motor 210 mounted above the machine on saw motor brackets 211 extended from the frame of the machine. The plane of the saw 209 is in the central vertical plane V. P. and as the peaches are moved past the saw, the peaches are cut in half. As the plane of the saw coincides with the seam or suture plane of the peach being sawed, each half of the peach will be substantially identical.

*Peach half separation stage E–F*

After the peach has been sawed into two substantially identical halves, the two halves are separated and changed in position, in preparation for the removal of the pit halves remaining in the peach halves.

Positioned on each side of the halving saw 209 in a vertical plane and close to the saw blade is a thin splitter plate 212 which enters between the saw and the sawed surface of the peach halves, the peach halves being held against the splitter plates by a finger pair as the carriages progress. The splitter plates are best shown in Figures 1 and 2.

As the carriage halves start downwardly around the angularly positioned drive sprockets 9 the splitter plates 212 flare outwardly and turn in plane, following the path of the finger pairs, so that the peach halves are pressed by the finger pairs against the splitter plates over the entire course of the splitter plates. To prevent the peach halves from changing position with respect to the splitter plates on which they are riding, the splitter plates are provided with ridges 214 as shown in Figures 1 and 2.

As the lower horizontal path of the carriage halves is reached, the splitter plates 212 have been twisted into a horizontal plane with the peach halves held on the top thereof by the finger pairs as shown in Figure 18. In this position the peach halves are ready for pit removal, and are sufficiently far apart laterally so that the pitting drive mechanism can be placed between the splitter plates. The pit halves are then cut out by a pitting mechanism in a pitting stage.

*Pitting stage F–G*

The pitting mechanism operating on the peach halves to remove the pit halves is best shown in Figures 18 and 19.

Extending outwardly from each side of gear box 11, which is located between the lower chain bars 6 and below the saw 209, is a pitting knife sleeve 214 rotatable in the side wall 215 of the gear box 11 in a sleeve bearing 216. Adjacent the outer end of each sleeve 214 is a pitting knife 217 having parallel ends 219 attached to a curved blade 220 which describes a radius with the center located at the intersection of the axis of the wobble pin with the axis of the shaft 224 and which is the general contour of a half pit. Pitting knife 217 is attached by ends 219 to a knife bearing 221 in which a wobble pin 222 extended from a wobble shaft 224 is rotatable. The wobble shafts 224 from each knife extend inwardly through sleeves 214 to join at a central pinion 225 within the gear box 11, this pinion 225 being rotated at high speed by mating gear 225a mounted on longitudinal shaft 57.

Sleeves 214 terminate outwardly in sleeve slots 226 in which the inner end 219 of the pitting knife and the knife bearing 221 are held.

The wobble pin 222 extends at an angle from one side of the end of each wobble shaft 224, crossing the axis of the wobble shaft 224 about midway of the extent of the wobble pin, this crossing being positioned substantially below the center of the line of peach pit travel over the splitter plates. Rotation of the wobble pins 222 by shafts 224 does not rotate the pitting knife 217, as the latter are restrained by the sleeve slots 226, but merely oscillate the knives rapidly.

In order that the pitting knives 217 be rotated over a path where they will pass around a peach pit half in a peach half, each sleeve 214 is inwardly joined by a bridge 227 extended over and around the central pinion 225 so that both sleeves 214 can be reciprocated by sleeve rod 228 through a sleeve arm 229. Sleeve rod 229 is driven by connection to an eccentric cam in the gear box 11 as will be described later.

If all peach halves were to be of substantially the same size, the pitting knife sleeves 214 could be solidly positioned. However, as pointed out above, it may be desirable for the machine to process ungraded fruit, in which case the halves presented for pitting may vary substantially in size. Thus, with the vertical position of the pitting blade fixed with relation to the plane of the cut surface of the peach, reciprocation of a pitting knife 217 over a fixed arc passing through a peach half, could take too large a cut out of a small peach half, and too small a cut to properly remove the pit half from a large peach half. Consequently, I prefer to position the pitting knife 217 vertically in accordance with the size of the fruit half being presented for pit removal.

In order that the pitting knives can be moved vertically, the sleeves 214 are each provided with a hinge 230 adjacent the side wall 215 of gear box 11 on the outside thereof so that the outer ends of the sleeves can be moved vertically. Inside the hinges the wobble shafts 224 are each provided with a flexible joint 231 so that these wobble shafts can be continuously rotated when the vertical position of pitting knives 217 is changed.

The vertical position of pitting knives 217 in each case is controlled by a roller 232 which is rotatably supported on a bell crank 234 rotatable on a bell crank bracket 235 positioned outwardly from each pitting knife 217 and attached to gear box base 236. Each roller 232 bears against the junction of the two fingers on each finger pair 25 of each carriage half as the latter pass by. This junction reflects the thickness of the peach half, as the finger pairs were moved into peach surface contact just prior to the sawing operation, as explained above. On each side, the end of bell crank 234 opposite roller 232 is connected by a link 237 to a sleeve extension 241. A stop 242 prevents each sleeve 214 from dropping below a minimum vertical position, between contacts of rollers 232 with the carriage halves.

In operation, each pitting knife remains substantially horizontal with curved blade 220 just below a splitter plate 212, each of which at this position is cut away with a blade slot 244 therein to permit reciprocation of the curved blade 220 over an arc passing around a pit half in a peach half being progressed along a splitter plate 212 by a carriage half.

As a peach half approaches the pitting position, each sleeve 214 is rotated by movement of sleeve arm 229 to move the pitting blade upwardly and in the direction of the moving peach half. At the same time each sleeve 214 is raised by roller 232 contacting the carriage half so that as the curved blade 220 of the pitting knife 217 reaches its topmost position, as shown in Figure 18 (left), the blade will be above the pit, but not so far above as to remove too great a proportion of each meat along with the pit.

Reciprocation of the knife continues with the blade moving with the peach half as the peach half progresses, until the blade swings again below the level of the splitter plate 212, after having passed completely around the pit half, which then drops out of the peach. The pitted peach half then continues on the splitter plate until past the discharge point of the pits and then the splitter plates terminate, permitting the pitted peach halves to drop on an output belt 245, for example. It is to be noted that both the blade 220 and the peach half are travelling in the same direction, but that the center of rotation of blade 220 is well below the splitter plate 212. This position of the center of rotation of the blade 220 permits the blade to travel faster than the peach half and provides a pitting cut in the peach which is of a substantially smaller radius than the radius of rotation of blade 220. Furthermore, the additional vertical motion applied by roller 232 to the blade, produces a cut in the peach which very closely approaches the curvature of the outer surface of the peach pit half, thereby conserving meat of the peach, substantially independently of the peach half size. The cut provided by the blade 220 is adjusted to make a cut based on the average relative size of the peach pit to the size of the peach.

It should also be noted that the continuous wobble or oscillation imparts a sawing action to the knife during its passage around the pit, which greatly aids in providing a clean meat cut, and avoids tearing of the meat as might occur from a direct pushing cut through the fruit meat, without blade oscillation.

It is further to be noted that the sleeves 214 are held against ends 240 of cranks 239 only by gravity. If, for example, an oversize pit should possibly be encountered by a blade 220 as this blade starts across the top of its arc over the pit half, the blade will climb the pit contour by the wobble action lifting the sleeve away from its support as the blade passes over the top of the pit half, returning to this support as soon as the blade has passed the peak of its arc. In this manner, oversized pits are prevented from being bodily torn out of the peach half, spoiling the shape of the remaining meat.

After the knife has removed the pit and the peach half has moved along to the discharge point, the knives 217 are rapidly reciprocated back to their original positions before the arrival of the next carriage half.

After the pitted peach halves are discharged from the carriage halves, these carriage halves are progressed back to the input end of the machine, with the carriage halves locked in the position that was determined just prior to the sawing operation. The carriages then enter the loading stage H—A again and each half is resized as hereinbefore described.

Gear box

The following members are driven from the gear box 11:
1. The probe block 166.
2. The seam orientation block 105.
3. The vertical slide 116.
4. The probe slide 182.
5. The longitudinal shaft 57.
6. The two chain drive sprockets 9.
7. The sleeve rod 228.

The star wheel 46, the pinion wire 94, and the wobble shafts 224 are driven from the longitudinal shaft 57, while the subconveyor chain 77 is driven by pins 100 attached to roller chains 10, as hereinbefore described.

Figure 20:
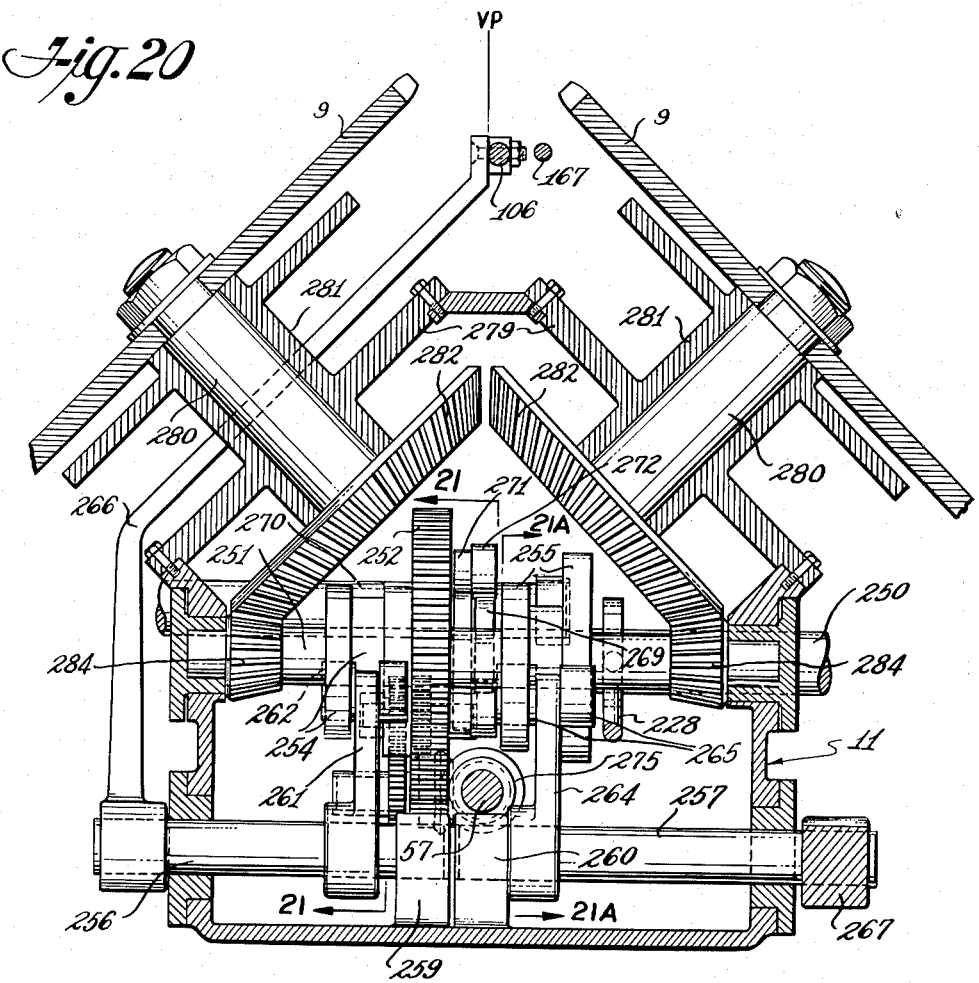
Figure 20 is a vertical sectional view through the gear box of the machine, taken as indicated by line 20—20 in Figure 2.
Figure 21:
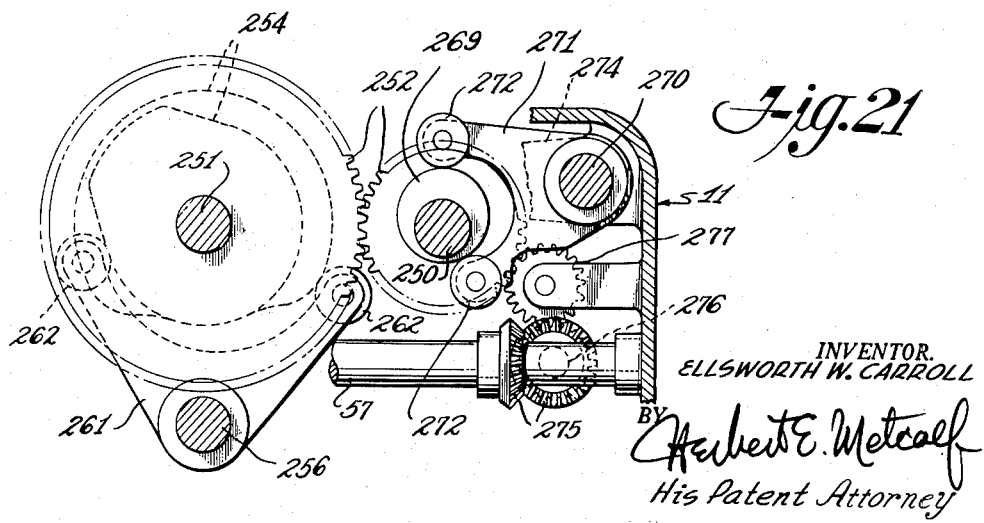
Figure 21 is a side view taken as indicated by line 21—21 in Figure 20.

The main elements of gear box 11 are shown in Figures 20 and 21.

Gear box pulley 16 is attached to a main shaft 250 extending laterally through the gear box 11 back of a parallel stub shaft 251. Main shaft 250 rotates one revolution for one cycle of the machine, i. e., for the progression of each carriage the center to center distance of the spacing of the carriage halves on the main chains 10. Stub shaft 251 is a ½ cycle shaft, being driven from main shaft 250 by spur gears 252 proportioned to provide the desired speed reduction.

On each side of stub shaft 251 is positioned two pairs of cams, a pair of block reciprocating cams 254, and a pair of vertical slide cams 255. One cam of each pair is the reciprocal of the other cam in that pair, so that cam followers can be given a positive drive in both directions.

Immediately below stub shaft 251, with their axes in alignment, are a pair of separate cam follower shafts, a block reciprocating shaft 256 positioned below the block reciprocating cams 254 and a vertical slide shaft 257 below vertical slide cams 255. Each of the shafts 256 and 257 extends through the side wall of the gear box, and are supported inwardly by end bearings 259 and 260, respectively.

The block reciprocating shaft 256 carries an upwardly extending reciprocating cam follower yoke 261 having a follower roller 262 on each end thereof, one of these rollers contacting each cam of the pair of block reciprocating cams 255. In a like manner, the vertical slide shaft 257 carries an upwardly extending vertical slide cam follower yoke 264, the ends of which carry cam rollers 265, one bearing on each vertical slide cam 255. Thus the two shafts 256 and 257 are oscillated in accordance with the respective cam contours.

On the outside of gear box 11, the block reciprocating shaft 256 is connected to a block reciprocating lever 266 which extends rearwardly, upwardly, and inwardly to terminate close to the central vertical plane V. P. of the machine just below the carriages. At this upper point, lever 266 is connected to the orientation block 105 through the reciprocating power rod 167. The cams 254 are designed to move the blocks with the carriages at carriage speed for 1½ cycles of the machine proper, returning the blocks in ½ cycle.

Figure 21A:
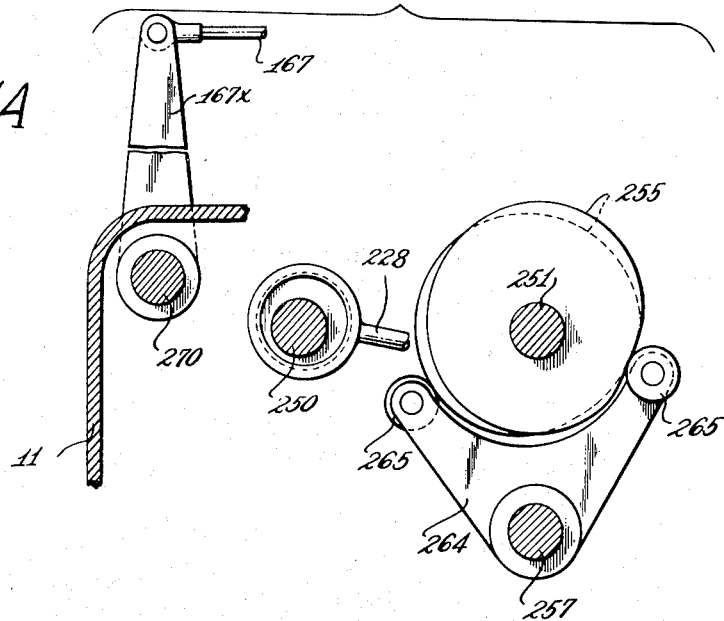
Figure 21a is a side view taken as indicated by line 21a—21a in Figure 20.

On the other side of the gear box, the vertical slide shaft 257 is connected to a forwardly extending vertical shaft lever 267, the forward end of which is connected to the lower end of the downwardly extending slide rod 117 shown in Figures 2 and 9. The vertical slide cams raise the vertical slide of the seam orientation stage rapidly, hold the slide up until the end of the seam block travel and then drop the slide. The shape of cams 255 is shown in Figure 21a.

Mounted on main shaft 250, alongside the shaft spur gear, is an inspection pair of cams 269. To the rear of the inspection cam 269 is a probe shaft 270 extending outside of gear box 11 to which is attached a probe yoke 271 having probe yoke rollers 272 on the ends thereof. Rollers 272 contact opposite inspection cams for positive drive of probe drive shaft 270. Outside of gear box 11 a forwardly extending probe slide lever 274 is attached at one end to probe shaft 270 and at the other end to the probe slide rod 184 so that the probe slide is reciprocated from its low point to its high point once for each reciprocation of the probe block 166.

Longitudinal shaft 57 is driven at twice the speed of main shaft 250 through bevel gears 275 one of which is attached to the end of longitudinal shaft 57, the other gear 275 being attached to an idler shaft 276. Idler shaft 276 is driven from main shaft spur gear 252 through idler shaft pinion 277.

The chain drive sprockets 9 are mounted on angularly positioned gear box plates 279 by sprocket shafts 280 passed through sprocket shaft bearings 281 formed in plates 279. Sprocket shafts 280 terminate inwardly in sprocket bevel gears 282 which mesh with stub shaft bevel gears 284, one on each end of the stub shaft 251. Bevel gears 282 and 284 and the drive sprocket 9 are sized, in a preferred machine embodiment, to progress 60 carriages per minute past a given point on the machine when the main shaft 250 is rotated 60 R. P. M., which is the preferred cycle speed of the machine, thereby enabling 60 peaches per minute to be processed.

The pitting knife sleeves 214 are reciprocated by eccentric strap 228 driven from shaft 250 as shown in Figures 21a and 18. Mounted on shaft 250 directly in back of cams 269 is another pair of cams to operate a duplicate shaft directly in back of the shaft 270. This duplicate shaft is secured to the lever 167X (also shown in Figure 21a) which is linked by the rod 167 to the probe block 166 to give the latter the desired reciprocation as before described.

*Modification of carriage*

Figure 22:
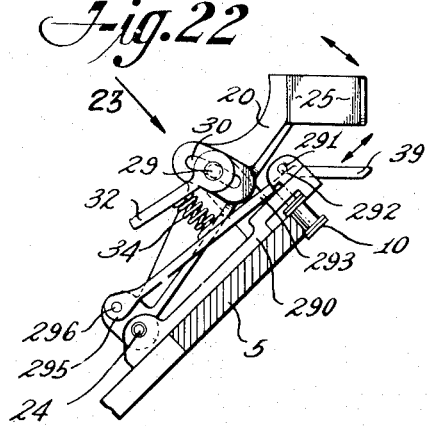
Figure 22 is a side view of a modified form of fruit carriage construction.
Figure 23:
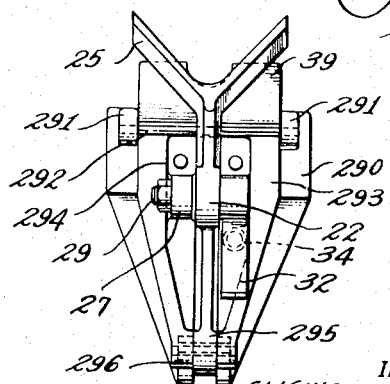
Figure 23 is a plan view taken as indicated by arrow 23 in Figure 22.

In Figures 22 and 23 a modified form of carriage half is shown which is made to be adjustable, not only as to the distance of the finger pair for the central vertical plane V. P. of the machine, but also as to the vertical position of the base plates on which the fruit rests. As large peaches usually have deeper indents than smaller peaches, lowering the base plates will permit the orientation wheels 91 and the indent fitting tips 124 to enter the indents more deeply before the sides of the indent rest on the base plates. Consequently, it may be desirable to adjust both the position of the finger pairs and the base plates, and in a constant relationship.

This type of adjustment is accomplished, as shown in Figures 22 and 23, by removing the base plate 39 from the carriage plate 21 and utilizing a special carriage plate 290 that extends only slightly above its connection to the roller chain 10.

On each side of special carriage plate 290 near the upper end thereof is an upright lug 291, these lugs 291 being connected by a guide pin 292 spaced from the carriage plate 290 to receive a sliding plate 293 fitting over the special carriage plate 290, being provided with a cutaway portion 294 to permit the sliding plate 293 to reciprocate as shown by the arrow and to end adjacent the pivot pin 24 of the central ribbed arm 22 of the carriage half, which is the same as for the carriage half previously described, except that above pivot pin 24, the ribbed arm 22 of the modified carriage half is provided with a drive pin lug 295 in which is held a drive pin 296 which extends laterally on each side of lug 295. The horizontal base plate 39 is in this case the upper end of the sliding plate 293, so that as the ribbed arm 22 is adjusted, as set forth above in the description of the loading stage I—A, the base 39 is also moved vertically, as indicated in Figure 22. Thus for large peaches not only can the restraint space be made larger laterally, but also the base plate 39 can be lowered so that the orientation wheels 91 and the indent fitting tips 124 can penetrate the indents more deeply in the larger peaches.

From the above description it will be apparent that there is thus provided a device of the character described possessing the particular features of advantage before enumerated as desirable, but which obviously is susceptible of modification in its form proportions, detail construction and arrangement of parts without departing from the principle involved or sacrificing any of its advantages.

While, in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

This application is a division of my pending application Serial No. 98,260, filed June 10, 1949, and entitled Fruit Orientation Device.

I claim:

1. In a machine for processing fruit having an elongated indent and a suture in substantially the same plane, a carrier, a plurality of carriages mounted on said carrier to securely hold fruit therein, means for progressing said carrier over a path, means operating on fruit in said carriages to position the stem indent of said fruit in a predetermined position and to orientate the fruit in its suture plane, an indent probe positioned to be moved into contact with said fruit at said predetermined position, said probe having an elongated indent probe tip capable of penetrating said indent when the elongations of said indent and of said tip substantially coincide, indent inspection means longitudinally slidably mounted on said probe tip, said inspection means being maintained stationary when the elongation of said indent and of said tip coincide, said inspection means being movable when said probe and said indent elongation do not coincide, reciprocating means for elevating said probe into fruit contact, means transmitting movement of said reciprocating means to said indent probe, said transmitting means being connected for operation by said inspection means, movement of said inspection means relative to said indent probe operating said movement transmitting means to disconnect said reciprocating means from said indent probe, said probe being elevated by said reciprocating means to push said fruit out of said carriage, and means operating on said latter fruit to remove the same from said machine.

2. In a machine for processing fruit having an elongated indent and a suture in substantially the same plane, a carrier, a plurality of carriages mounted on said carrier to securely hold fruit therein against gravity, means for progressing said carrier, means operating on fruit in said carriages to position the stem indent thereof in a downward position and to orientate fruit in its suture plane, an indent probe positioned to be moved upwardly into contact with a fruit held in a carriage, said probe having an elongated indent fitting tip capable of penetrating said indent to a substantial extent only when the elongations of said indent and of said tip substantially coincide, indent inspection means longitudinally slidably mounted on said tip and stationary therewith only upon penetration of said tip into said indent when said indent elongations and said tip coincide, reciprocating means for moving said probe upwardly for indent penetration, means operated by movement of said probe tip and indent inspection means to elevate said fruit out of said carriage when said tip and said indent do not coincide, and means for ejecting said fruit from said machine.

References Cited in the file of this patent

UNITED STATES PATENTS

| | | |
|---|---|---|
| 2,225,979 | Carroll | Dec. 24, 1940 |
| 2,232,209 | Carroll | Feb. 18, 1941 |
| 2,277,903 | Carroll | Mar. 31, 1942 |
| 2,343,496 | Carroll | Mar. 7, 1944 |
| 2,398,780 | Ewald | Apr. 23, 1946 |